(12) United States Patent
Bailey (10) Patent No.: US 7,793,425 B2
(45) Date of Patent: Sep. 14, 2010

(54) COORDINATE MEASURING MACHINE

(75) Inventor: Ralph-Peter S. Bailey, West Sussex (GB)

(73) Assignee: Makex Limited (GB)

( * ) Notice: Subject to any disclaimer, the term of this patent is extended or adjusted under 35 U.S.C. 154(b) by 24 days.

(21) Appl. No.: 11/997,122

(22) PCT Filed: Jul. 25, 2006

(86) PCT No.: PCT/GB2006/002769
§ 371 (c)(1),
(2), (4) Date: Jul. 11, 2008

(87) PCT Pub. No.: WO2007/012836
PCT Pub. Date: Feb. 1, 2007

(65) Prior Publication Data
US 2009/0133276 A1    May 28, 2009

(30) Foreign Application Priority Data
Jul. 26, 2005    (GB) .................................. 0515328.3

(51) Int. Cl.
*G01B 5/004* (2006.01)
*G01B 5/008* (2006.01)
(52) U.S. Cl. .......................................... 33/503; 33/556
(58) Field of Classification Search .................... 33/503, 33/556, 557, 558, 559, 560, 561
See application file for complete search history.

(56) References Cited

U.S. PATENT DOCUMENTS

| | | | | |
|---|---|---|---|---|
| 4,776,749 A | * | 10/1988 | Wanzenberg et al. | 414/680 |
| 5,401,128 A | * | 3/1995 | Lindem et al. | 409/132 |
| 5,909,939 A | * | 6/1999 | Fugmann | 33/503 |
| 6,648,583 B1 | * | 11/2003 | Roy et al. | 414/735 |
| 6,681,495 B2 | * | 1/2004 | Masayuki et al. | 33/501 |
| 2004/0013509 A1 | * | 1/2004 | Roy et al. | 414/735 |
| 2004/0040805 A1 | | 3/2004 | Bailey | |
| 2004/0079844 A1 | * | 4/2004 | Bailey | 248/127 |

FOREIGN PATENT DOCUMENTS

| | | |
|---|---|---|
| DE | 10301985 A1 | 7/2004 |
| EP | 0763708 A2 | 3/1997 |
| GB | 2289001 A * | 11/1995 |
| WO | 0234461 A2 | 5/2002 |
| WO | 03037562 A1 | 5/2003 |

* cited by examiner

*Primary Examiner*—Amy Cohen Johnson
(74) *Attorney, Agent, or Firm*—Pablo Meles; Guntin Meles & Gust, PLC (57) ABSTRACT

A coordinate measuring machine operable to employ penta-pod kinematics to determine the absolute position at a measuring point tip by measuring about five axes. The machine comprises a first, bifurcated linkage, a second, trifurcated linkage, and a plurality of elongate struts. First and second ones of the plurality of struts share the first linkage, third, fourth and fifth ones of the plurality of struts share the second linkage, and the first and second linkages are coupled via a handle. The first and second struts are preferably rotatably engaged to the first linkage, and the third, fourth and fifth struts may be rotatably engaged to the second linkage. First through fifth nodes may be provided, each node being slidably engaged to a corresponding one of the first through fifth struts. The nodes may comprise means for measuring the displacement of the corresponding strut relative to the node.

23 Claims, 11 Drawing Sheets

COORDINATE MEASURING MACHINE

FIELD OF THE INVENTION

The invention relates to a device for determining the geometrical dimensions of an object by a process of surface probing including digitising a path along an object rather than just a point. By articulation about six degrees of freedom (6 DOF), a user may be enabled to access more of an object's surface without having to move the object or fit a new stylus to the probe. The device uses a novel form of parallel kinematic architecture to enable spatial data to be measured without the usual cost and complexity. It also employs novel linkages to ensure better accuracy and repeatability than would usually be possible at such low costs.

BACKGROUND OF THE INVENTION

Increasingly, product designers with 3D CAD tools are producing curvilinear parts that are very difficult to measure with a single axis device, be it a ruler or a digital calliper gauge.

Coordinate Measuring Machines (CMMs) are a common tool for the metrology of 3D objects. They tend to either use a gantry type mechanism that articulates in a Cartesian fashion about 3 DOF and gathers single point data with the aid of a touch trigger probe, or they use a polar mechanism that articulates like a 6 DOF arm and gathers data from a fixed probe point or laser scanner.

The former Cartesian machines have been refined and value engineered over many years but will always be expensive to build because the component technologies are expensive (sensitive probes, marble beds, air bearings, precise linear encoders, a very stiff frame etc). The polar machines are difficult to engineer accurately because each degree of freedom is attached together in a series chain so that errors accumulate and the total stiffness and accuracy is the sum of all six linkage and encoder inaccuracies. Also radial encoders that maintain micron accuracy at the end of a long lever are very expensive.

The inherent build and accuracy factors result in machines that have an entry level cost of over £10 k, often controlled by complex professional software that not only has a high capital cost but also takes a lot of training to use properly.

The demand for multi axis measurement is expected to grow rapidly, but to date there has not been a tool that is both affordable and easy to use for the small scale or discretionary user. The aim of the present invention is to fill this market niche in that the machine can be built at very low cost, it is robust for use in industrial conditions and new software paradigms make its use fast and uncomplicated.

SUMMARY OF THE INVENTION

According to the present invention, there is provided a coordinate measuring machine as set forth in the appended claims.

Embodiments of the invention can enable a parallel kinematic architecture to be exploited to produce a low cost measuring machine. Embodiments herein can also enable low build cost multi-axis linkages that are very repeatable and hysteresis free. In yet other aspects, embodiments herein can employ length encoders attached to stiff triangular section carbon fibre struts that will provide thermally stable and accurate displacement measurements. Measurement accuracy can also be improved using a handle that promotes a steady and predictable contact pressure between the object and the stylus tip according to other embodiments. Embodiments herein can also package the mechanical solution in a robust and compact style that enables it to be operated on the desk top at the user's convenience without special clean room or air conditioning requirements. Embodiments herein can also provide for software that presents a very intuitive and quick to use interface that also can extract more useful data from the part like contoured topography and surface roughness.

The present invention can be broken up into the following constituent aspects: kinematics, linkages, struts, encoder nodes, handle, packaging and control system. These are each discussed below.

Kinematics:

Parallel link mechanisms function in dependence upon the movements of plural linkages working in concert to determine a position, whereas in serial link mechanisms, each linkage operates independently.

The typical multi-axis parallel architecture is an articulated octahedron known as a hexapod where the lengths of 6 struts unambiguously define the position of the machine's end effector about 6 DOF. Given a target end position, the required strut lengths can be readily calculated (the reverse kinematic transform), whereas, given the 6 strut lengths, the calculation of the end position (forward kinematic transform) is more onerous and can generally only be solved by processing intensive iterative methods. Also a hexapod fully constrains all 6 DOF, but a measuring machine does not need to measure the rotation of the stylus about its own axis. It only needs five axes so the sixth axis is essentially wasted.

The present invention uses a 'pentapod' configuration comprising five struts acting between five nodes and two linkages. Three of the struts are arranged to meet at a trifurcated joint (i.e., a tripod) at a first of the linkages and the other two struts are arranged to meet at a bifurcated joint (i.e., a "V") at the second linkage. The first and second linkages are spaced apart by a handle which has a stylus attached thereto. Thus, the handle is supported by the two linkages (one at each end), and where one linkage forms the vertex of a 3 strut tripod and the other forms another tripod vertex, but using the first vertex as one of its tripod bases. The five strut lengths unambiguously define the stylus position in space, with unnecessary rotation about the handle axis constrained by the linkages.

This kinematics is much easier to solve, especially the forward transform that is necessary to calculate the location of a probed point which can now be readily calculated in real time.

Linkages:

A challenging aspect of the Pentapod kinematics is the preference to maintain a unified focal point for the strut articulations at either end of the handle.

One of these linkages has to permit 2 struts and the handle axis to be able to articulate freely about a shared focal point. In this case the pair of strut ends need 3 DOF with respect to the handle, but only 1 DOF between each other (scissor action). This is called a 'tri-joint'.

The other linkage supports all the freedoms of the first, but also a third strut that has a 1 DOF pivot connection with the handle about the same shared focal point. This third strut also effectively constrains the handle from unfettered rotation about it's own axis. This is referred to as a 'quad-joint'.

These linkages must have a very stable focal point for accurate parameter calibration as required by the calculation transform. They must be backlash free. Their design also needs to minimise the parasitic frictional torque that may otherwise introduce stresses into the mechanism that can compromise its accuracy or its smooth and unbiased articulation.

According to embodiments of the present invention, an array of small magnets are provided that pull the two strut arms together on either side of the node ball (that work like scissors sharing a common pivot axis). This provides for the necessary preload without incurring additional friction. The preload is retained even as the sockets slightly wear down.

The other ends of the struts are independently supported by linkages constrained to the machine frame. These five linkages are also conceptually similar to ball and socket joints, with the balls being large enough to retain the encoder modules that measure strut extension and support their axial movement through the focal points. It is also important that these links have a low parasitic torque, and in this case it is more challenging because they have a larger diameter so any rotation has a higher tangent speed and striction a greater leverage.

Rather than just having a sliding interface, in a preferred embodiment, the nodes may be supported by three miniature re-circulating ball transfer units. Magnets may again be employed for preloading, holding the ferromagnetic node spherical shell that houses the encoder against the three ball transfer units.

The main benefit of this embodiment is that there is only rolling friction so the sphere nodes can rotate freely about 3 DOF. The arrangement is kinematically pure like a 3 legged stool and has excellent repeatability with no positional ambiguity. The magnets take the place of a further array of bearing points that would usually be employed to effect the node's preloading into the reference position and as such they do so without contributing any more friction or being a wear risk.

Struts:

The struts preferably pass through the focal point of the base nodes where their subtended length is measured. This is preferable to other methods because there can be a large ratio between maximum and minimum effective length (between the base node and the handle) unlike telescopic solutions. The struts then also remain uncomplicated and stiff.

The encoder in the node reads a track attached to the strut and as such is not unduly compromised by mechanical errors (like the endemic bearing run-out and straightness issues with a radial solution). Also because the measured length is focal point to focal point, a small degree of curvature in the struts will not significantly alter the measured length and so degrade the accuracy. In this embodiment, the track is preferably a flexible printed circuit board with a repeated pattern that is bonded to the strut by a non compliant adhesive (such as epoxy). It has a hard top surface that bridges the topography caused by the etched copper and can sustain the pressure of the node rollers without denting.

The struts may be comprised of pulltruded carbon fibre in a hollow triangular section providing external flat surfaces to support the encoder track and two roller tracks. A significant advantage of carbon is the near neutral coefficient of thermal expansion and the excellent stiffness with low mass.

Encoder Nodes:

There are many types of linear encoder that could be employed for this application, however in terms of low cost and robustness, preferred embodiments use a capacitive solution similar to that employed by digital calliper gauges, which has been judged to be the most appropriate because it involves no contact, is dirt immune and robust and has a low cost. Conventional capacitive encoders may be used that have been significantly upgraded to provide a resolution of 2 microns and a sampling rate of 200 Hz.

Capacitive encoders are however quite sensitive to variation in the offset between the reader circuit and the encoder track. Accordingly, the mechanical design has to optimise on controlling this parameter. Consequently, it is preferable that the encoder reader circuit is held at a fixed displacement from the track because the strut is preloaded against rollers that are fixed relative to the reader.

Another objective is to restrict all other strut movement relative to the node to its own axis. This is achieved by employing a runner with rollers arranged on adjacent sides to roll along the two upper surfaces of the triangular strut. Preferably, the runner applies the preload that keeps the strut in contact with the rollers that define the read head offset. The runner should also be supported to prevent movement orthogonal to the axis or skewing about the axis. In all other respects it should preferably be able to settle unambiguously such that its rollers are always in full contact with the strut. According to a preferred embodiment, a single leaf spring provides all the necessary freedoms and constraints.

Handle:

In a conventional CMM, the replaceable stylus is held in a very repeatable settling position by a small preload force. When the tip of the stylus is loaded, the stylus displaces from its mounting by tilting or moving inwards, and in so doing activates a switch. The switch is designed to generate a signal the instant it is displaced and the machine's position at that instant is recorded. Compliance is enabled in the stylus overtravel, but once displaced the stylus tip position becomes unreliable, therefore this type of probe can only output point data.

Other CMMs—particularly the polar 6 DOF variety—do not have a switch attached to the stylus. The user merely holds the tip against the surface to be measured and presses a button (with finger or foot). The stylus tip has to be very rigid because there is no control over the contact force that the user applies.

In this case, the stylus tip does not tilt as with a conventional probe but is fixed like a 'polar' probe—however the handle casing which the user holds to move the stylus can tilt against a spring preload relative to the handle shaft about 3 DOF (two axis tilt and inward displacement) when loaded against the object to be measured. It acts as a switch such that when it displaces the stylus tip, position readings are taken. The exact moment when displacement starts is not critical because the exact stylus position remains known even when the handle tilts. It is therefore a much simpler and more robust solution.

The advantages are that the tip of the stylus is always held at a known position so it is possible to 'stream' data continuously along a path, not just take individual sample points. The more data that is taken, the more accurately part geometry can be calculated.

According to a preferred embodiment, the handle displacement is measured by a proportional sensor such that the degree of stylus preload can be associated with each data point. Knowing the preload value and the tip contact vector (processed after a first pass at deducing the measured geometry), the positional error introduced by the probable flex of the stylus can be compensated for.

In this embodiment, the spring that generates the handle tilt preload may itself be adjusted by the user from a very soft spring to completely rigid. The adjustment value is read by a further proportional sensor, and knowing the length of the stylus tip can be equated to a grams force loading. When calculating the flex error compensation (as above) this value is used as the spring rate.

The handle may be allowed to rotate freely about its own axis (but not the stylus tip) in order to enhance the ergonomics in difficult access situations. It may also feature a four position finger operated button. When pushed forward, the system is waiting for the handle to tilt upon which event it will output stream positional data. When pushed back the system will output only a single point every time the handle it tilted. When pushed downward the system registers a 'click' similar to pushing a 'mouse' button to control the application software. This enables the device to control the software directly as if it were a mouse but additionally enables it to position any model graphics synchronously about 5 degrees of freedom. It is more convenient and faster to use than having to release the handle and pick up a mouse.

Packaging:

The nodes have to be held in a fixed and stable position relative to each other. The nodes are preferably connected by a truss framework comprised of carbon fibre tubes bonded into node support mouldings or the frame base. This predominantly resolves the forces into tension or compression, avoiding bending moments that could corrupt the node positions.

The nodes themselves may use elastomeric covers to isolate the spherical bearing mechanism from the ingress of dirt. This is important as the device employs magnetics in these linkages which could attract metal particles when used in some workshop environments. The tri-joint and quad-joint at either end of the handle are similarly protected.

In order to more readily establish any error compensation to correct for positioning factors after replacing the stylus, a known location reference point is preferably attached to the front of the base that can be reached by the stylus tip. This reference point is like a conical receptacle into which a ball on the end of the stylus can be located. Knowing the diameter of this ball, its focal point when in the receptacle is also known. This is compared to the calculated focal point deduced from the 5 strut lengths. Any variance is indicative of an angle or length offset associated with the new stylus tip and can be subsequently compensated for.

The base preferably also has space for the system control electronics and may use an inserted profile cut steel sheet as a weight. In this case, on each of the sides of the base moulding, a hatch cover may conceal a storage space that can be used for holding utilities (much like a sewing machine has an integrated tool box).

Other accessories can be provided. A useful aid to holding a very curvilinear object in a stable position during metrology is a plate with an array of elevated features into which a curved shape can nestle. The simplest embodiment of this concept would be like a waffle plate comprising an x, y array of pyramidal features.

The Pentapod architecture lends itself to scaling up in size without attracting much additional cost. In a conventional machine, to maintain the same maximum deviation in a loaded beam, the beam stiffness has to increase by the cube of its length. That is expensive. With the Pentapod, the accuracy of the data is optimum when the machine frame and struts delineate near equilateral triangles. To scale the machine up to enable a larger working volume without losing accuracy the aspect ratio of the triangles should be maintained by increasing the distance between the frame nodes in proportion to the increase in length of the struts. This costs very little and all else can stay the same.

Control System:

As explained above, the unique qualities of the pentapod kinematics lend themselves to a very quick forward transform of end position into a Cartesian coordinate system, but it does depend on a precise knowledge of the machine's node and stylus offsets. This could be obtained from precise manufacture perhaps using replication techniques to bond the nodes into fixed reference positions, or from post assembly measurement of the node positions, or by deducing the exact node positions by reference to a known object.

The simplest known object is a fixed point with a conical receptacle embodiment as described above for stylus error compensation. If the handle is articulated while the tip is retained at a fixed position, if all calibration values were correct, the software should report a constant fixed point irrespective of handle angle. Any error in the calibration values will manifest itself in the calculated tip position appearing to move in a locus. The shape and size of this locus is indicative of the errors that cause it and can be analysed to determine the individual calibration error values and hence compensate for them. This technique delivers enhanced resolution when the reference point receptacle is moved around the limits of the machines working volume and multiple tests are performed.

The struts may well have a pitch error in a pattern array of a printed circuit board encoder track. This pitch error is stable and can therefore be compensated for, if identified, by comparing a strut against an accurate absolute displacement transducer and holding the determined pitch error values in a look up table associated with each strut. By this means the individual axis absolute accuracy can approach that of the very best encoder without its probable high cost and stringent operating conditions.

In order that the present invention, in all of its aspects, might be clearly understood, exemplary embodiments will hereinafter be described with reference to the accompanying drawings.

DETAILED DESCRIPTION OF THE EMBODIMENTS

Figure 1A:
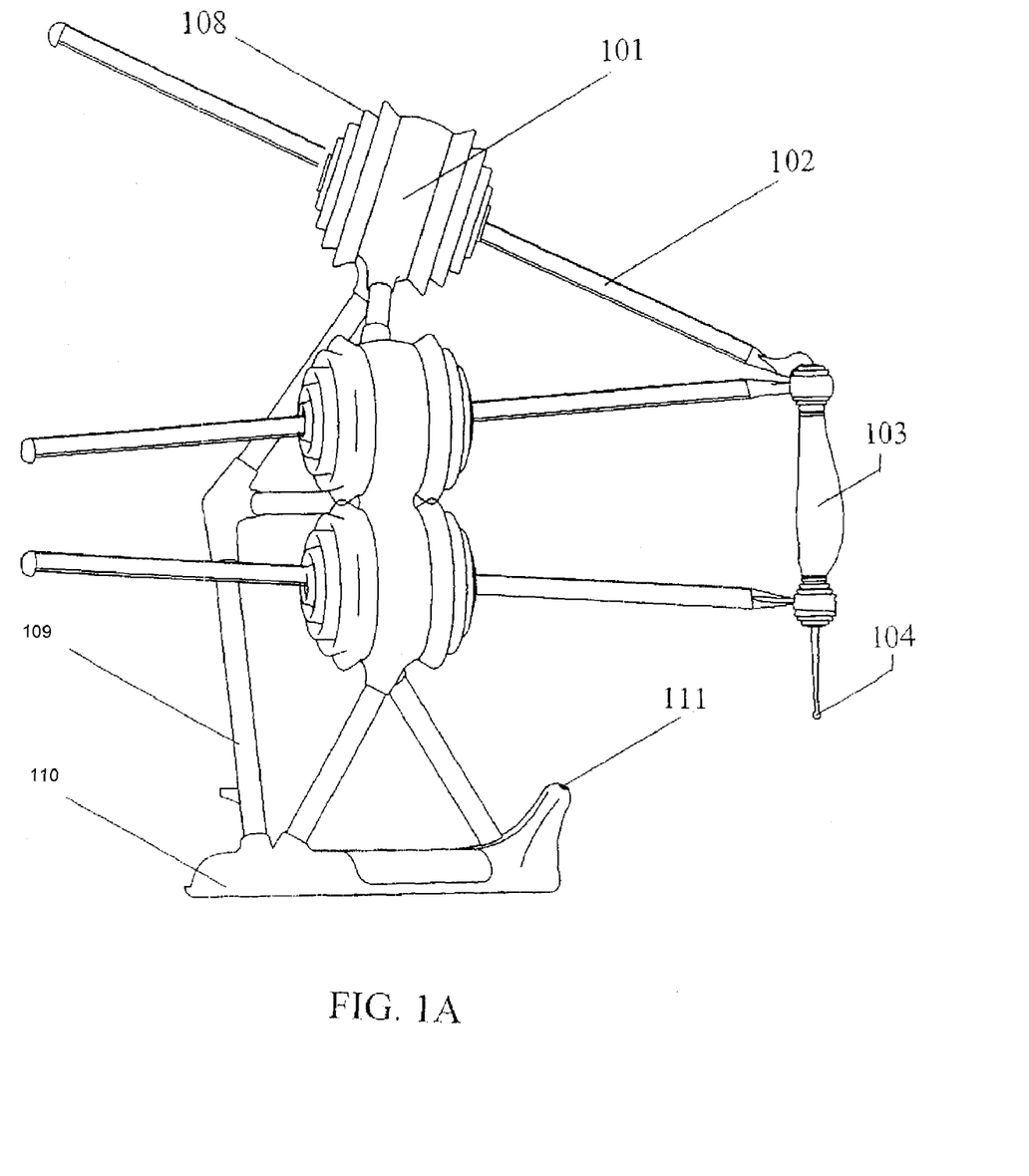
FIGS. 1a and 1b show perspective views of a device according to a first embodiment of the invention.
Figure 1B:
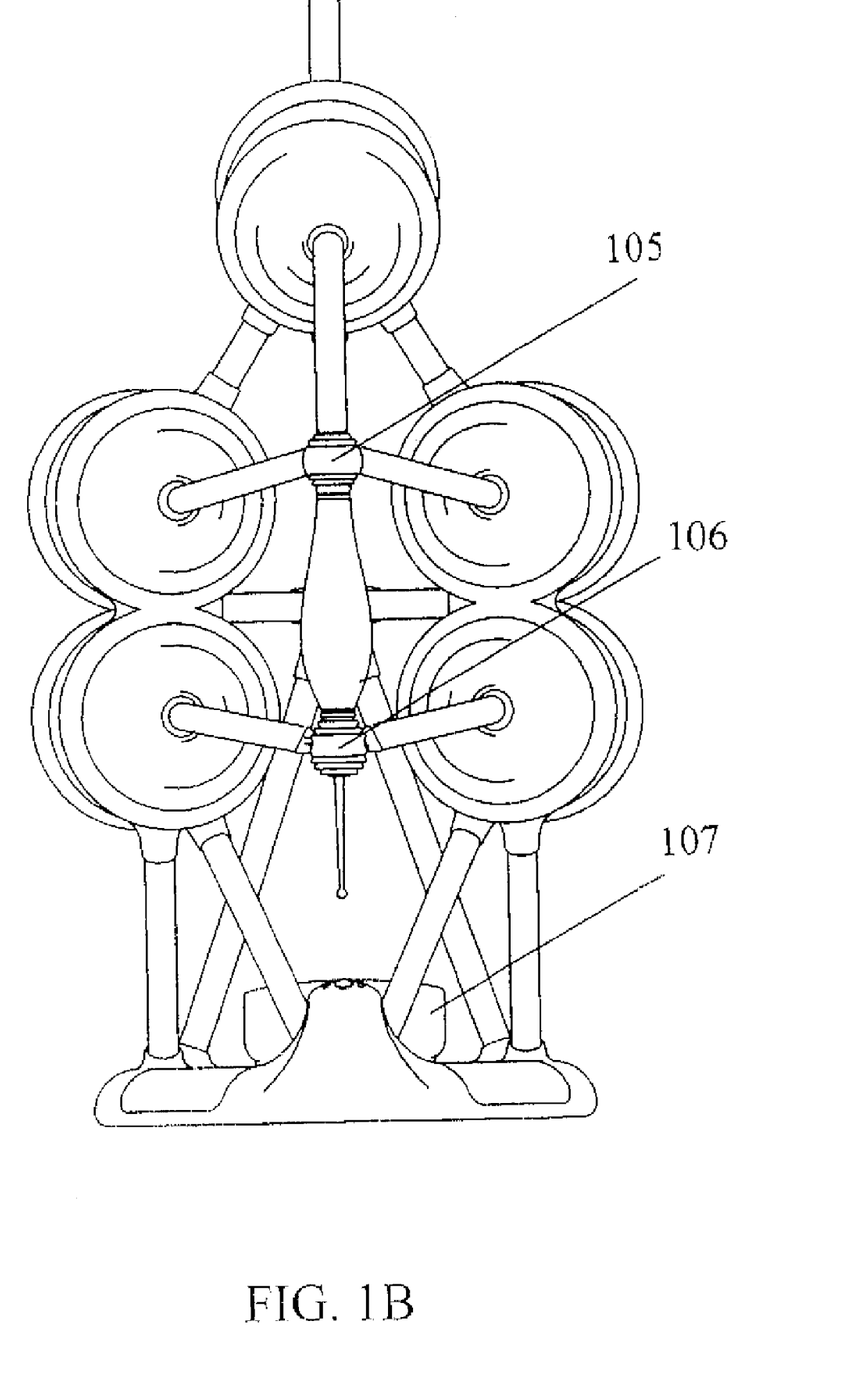

FIGS. 1a and 1b show side and front elevations respectively, of the device according to a preferred embodiment of the invention.

The truss framework that supports the nodes is arranged like a tetrahedron with a node 101 at its top vertex with other node pairs at the front bottom vertices. The back vertex and the lower front vertices are then connected like an octahedron with six struts 109 to the base moulding 110.

Five struts 102 then pass through the nodes 101 and connect as a tripod with its vertex at the quad-joint 105 and using this point as a new base point form another tripod with its vertex at the tri-joint 106, separated by the handle 103. The handle 103 extends downwards with a replaceable stylus tip 104, preferably with a hard ball at its end.

Elastomeric covers 108 connect the node frame to swivels on the struts on both sides of the nodes to prevent the ingress of contaminants.

At the front of the base 110 is an extension 111 that supports an inverted conical receptacle in a fixed and known position where it can be reached by the end of the stylus to enable stylus calibration for error compensation after a stylus has been replaced.

Figure 2:
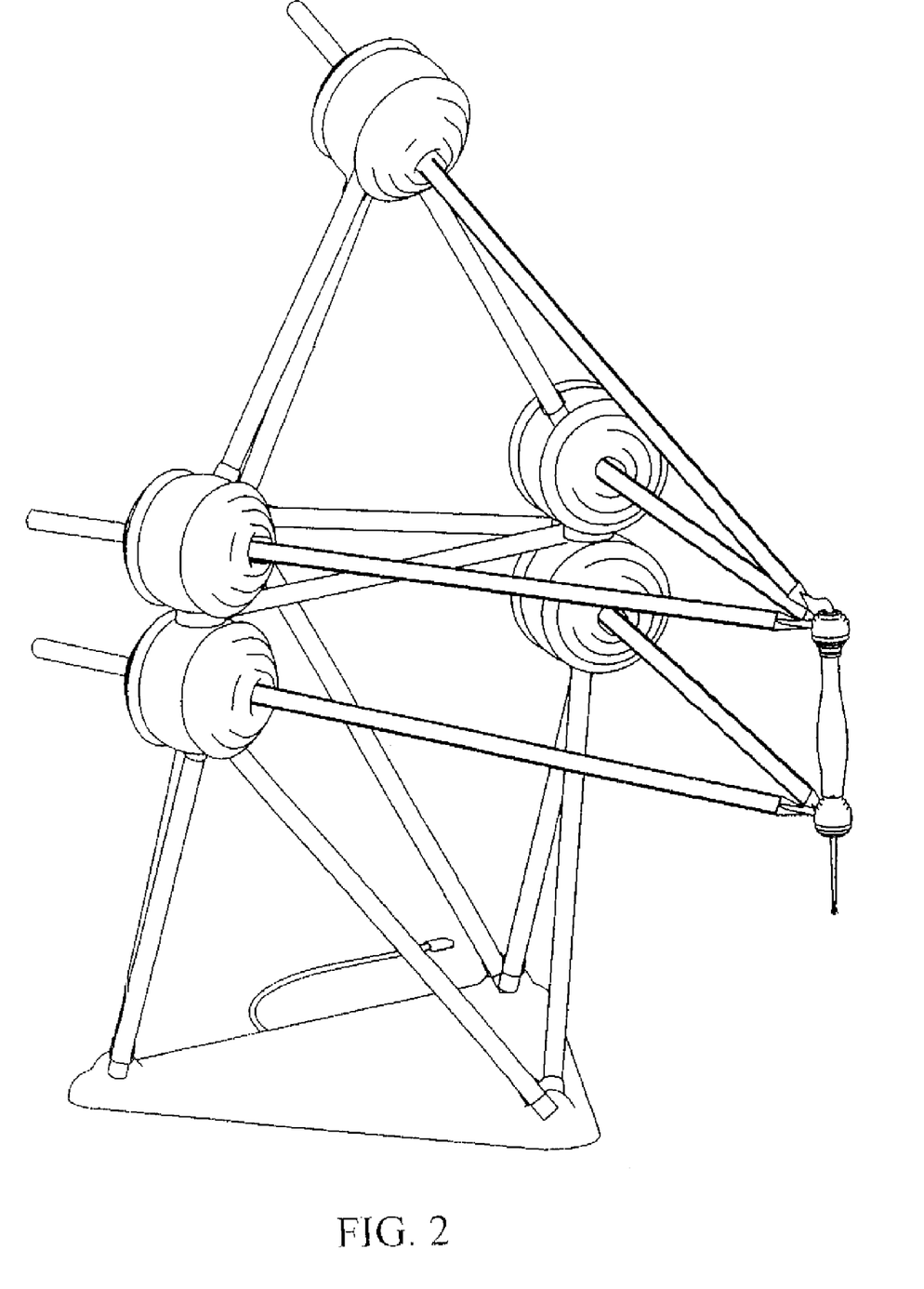
FIG. 2 shows a perspective view of an alternative embodiment.

FIG. 2 shows an isometric view of a similar frame architecture according to another embodiment, but where the struts have been extended to enable a much larger working volume—in this case 2×2×2 or 8 times greater—while maintaining the same triangle aspect ratios and hence positional accuracy. Other strut lengths may also be used but it is preferable to maintain the same triangle aspect ratios to maintain the positional accuracy.

Figure 3:
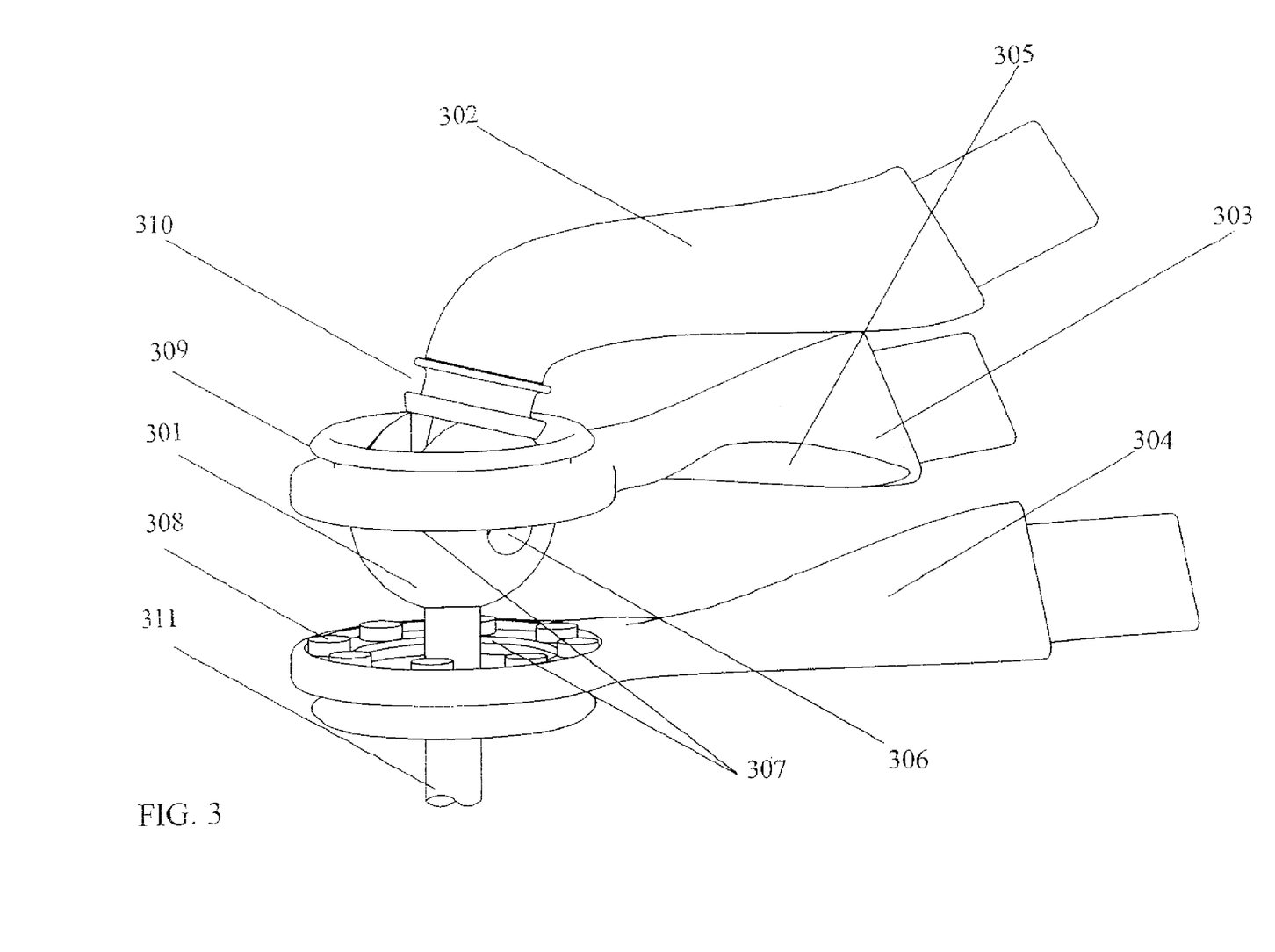
FIG. 3 shows an embodiment of a trifurcated joint according to the invention.

FIG. 3 shows an embodiment of a quad-joint. A tri-joint would be similar except that the top pivoting arm 302 would not be necessary. A ball 301 is attached to the handle shaft 311. The ball is cut away to enable the strut arm 302 to pivot about the orthogonal axis 306 that passes through the ball focal point. Two further strut arms 303,304 have circular ends that circumscribe the ball like annular sockets that conform to the ball's diameter. In order to allow them to reach a small relative included angle, they are both cut away 305 similar to around the pivot of a pair of scissors.

A thin ferromagnetic steel ring 307 is inserted into each of the strut arms 303,304. On one of the arms 304, an array of small thin magnets 308 (preferably neodinium iron boron type) is attached to the ring 307. When the two strut arms 303,304 are brought together around the ball 301, the annular sockets prevent them touching all the way around and the magnets on one ring cannot touch the ring on the other arm. They do though attract each other, and in this way preloaded contact between the annular sockets and the ball 301 is maintained without incurring any frictional penalties. In an alternative embodiment, the steel ring 307 supporting the magnets 308 is omitted commensurately larger magnets (acting without the benefit of a magnetic circuit) are directly embedded into the strut arm moulding.

Each arm 303,304 has an annular groove 309 which can retain one end of an elastomeric cover. The other end of the cover fits onto a ring 310 attached to the strut arm 303,304 or similarly to the handle shaft 311. The benefit of attaching to a ring 310 that can swivel is that it can thereby better relieve the cover displacement stresses as the parts articulate.

Figure 4A:
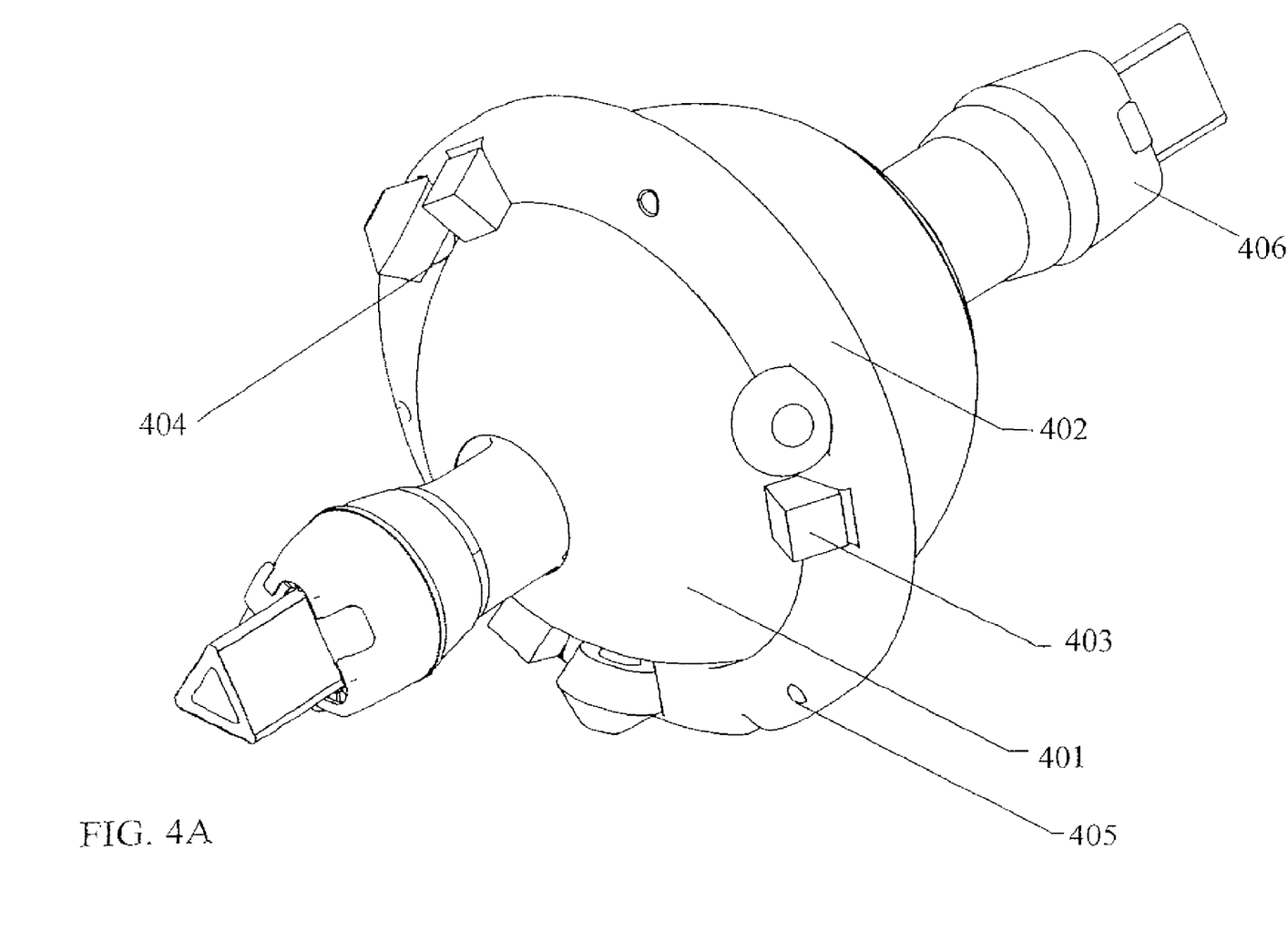
FIGS. 4a, 4b and 4c show preferred embodiments of an encoder node shown in FIGS. 1a, 1b and 2.
Figure 4B:
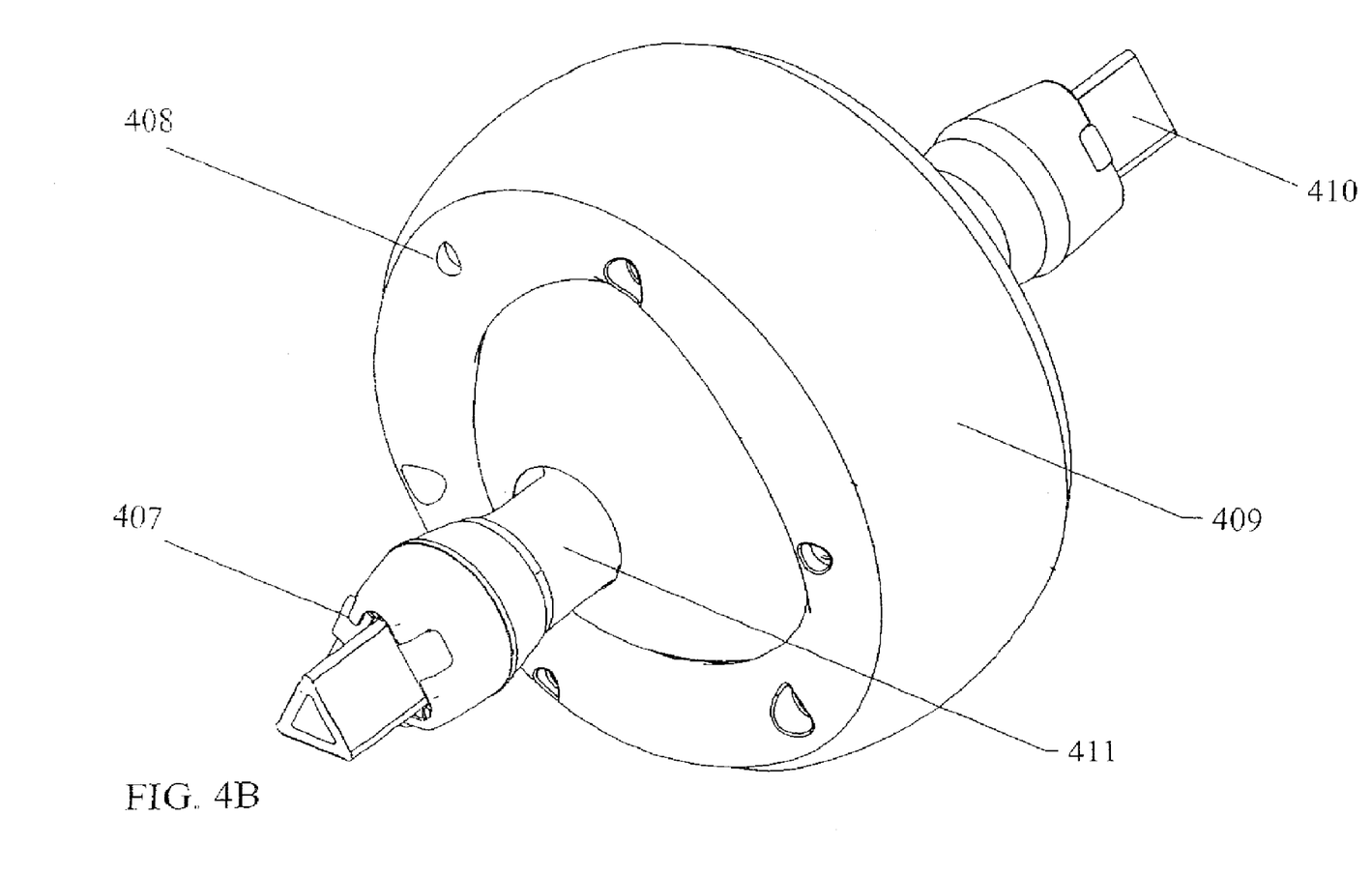
Figure 4C:
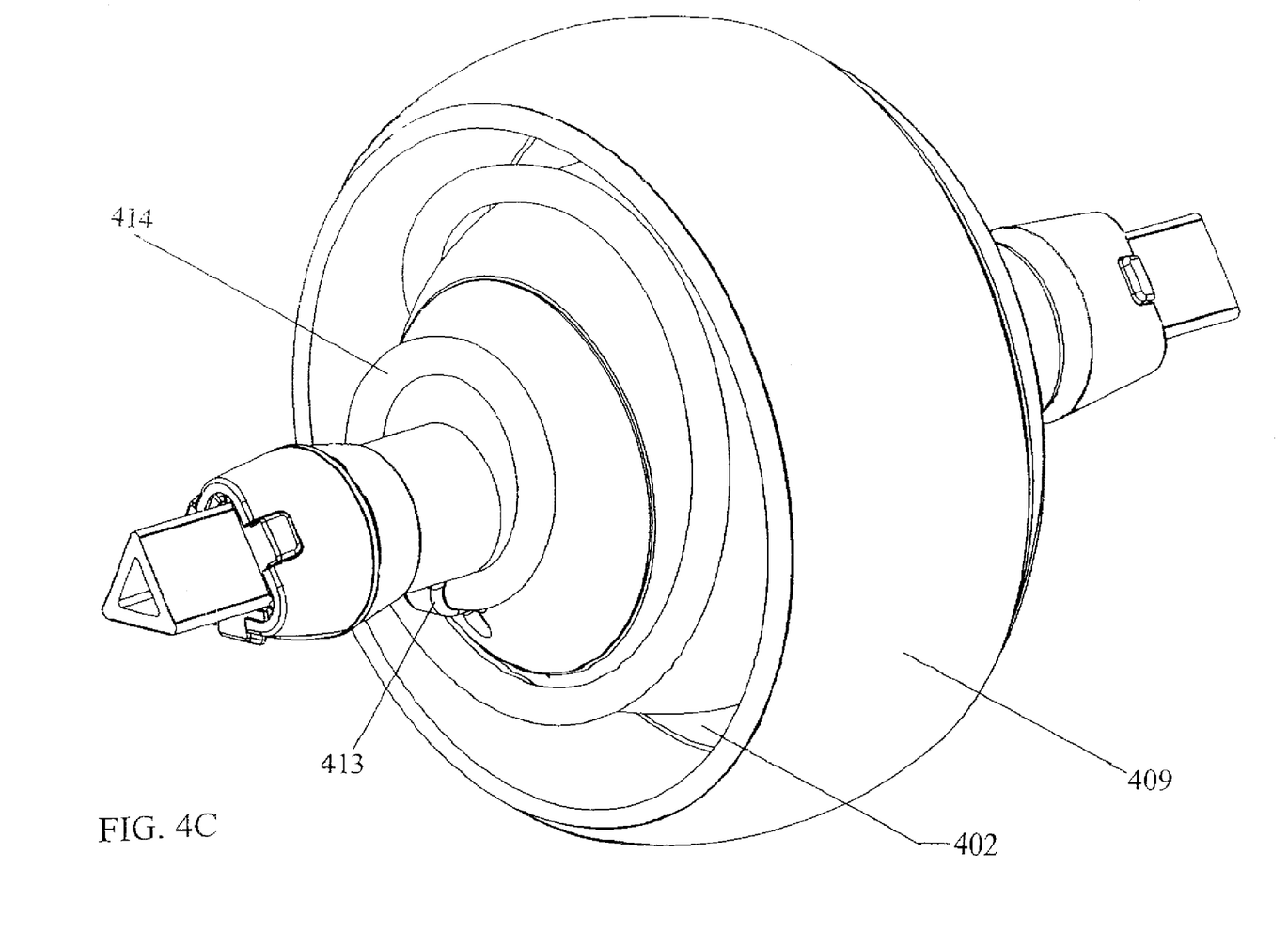

FIGS. 4a, 4b and 4c show a ferromagnetic ball 401 that houses an encoder and strut support mechanism held against a ring 402 which in turn is retained against a frame node support 409 by fasteners passing through an array of holes 405.

Sandwiched between this ring 402 and the frame support 409 are three magnets 403 and three recirculating ball transfer units 404. The magnets 403 pull the ball 401 inwards until constrained against the ball transfer units 404 in a kinematically unambiguous position (like a 3 legged stool). A ball transfer unit 404 is comprised of a ball that can freely rotate in any direction as it sits on a bed of small balls that can recirculate. Being rolling friction only, the three units 404 permit the node ball 401 to rotate about 3 DOF with very little resistance.

In this embodiment, wedges acting behind the magnets and positionally adjustable by fasteners acting through holes 408 in the frame support can be used to trim the separation between the magnets 403 and the ball 401 to an optimum offset.

Moulded extensions 406 from the ball 401 serve two purposes. They retain one end of the elastomeric node cover, and also house a dust seal acting against the strut 410. In this embodiment, the dust seal may be comprised of three felt pads with plastic supports retained by, for example, plastic clips 407 that can be removed and replaced from around the strut 410 without having to disassemble the strut 410 from the node.

The node frame ring 402 is cut away to permit the strut 410 to articulate about as large an angle as possible. Because the strut 410 is triangular, the optimum orifice form is not circular but tri-lobar. Where the ring 402 has to retain the magnet 403 and ball transfer unit 404 it extends a little further around to hold the ball at a more advantageous angle. This is matched radially with the flat surfaces 411 on the ball extension strut.

Because the ball 410 is supported against the forward ring 402 only, there is no need to obtain additional clearance for the strut to articulate on the reverse side (as shown in FIG. 4c). In a preferred embodiment, this is given over to providing space for a spiral umbilical 414 that connects the encoder electronics from a node housing exit point 413 to the master circuit board in the base, preferably using the tubular truss frame of the device as a conduit.

Figure 5A:
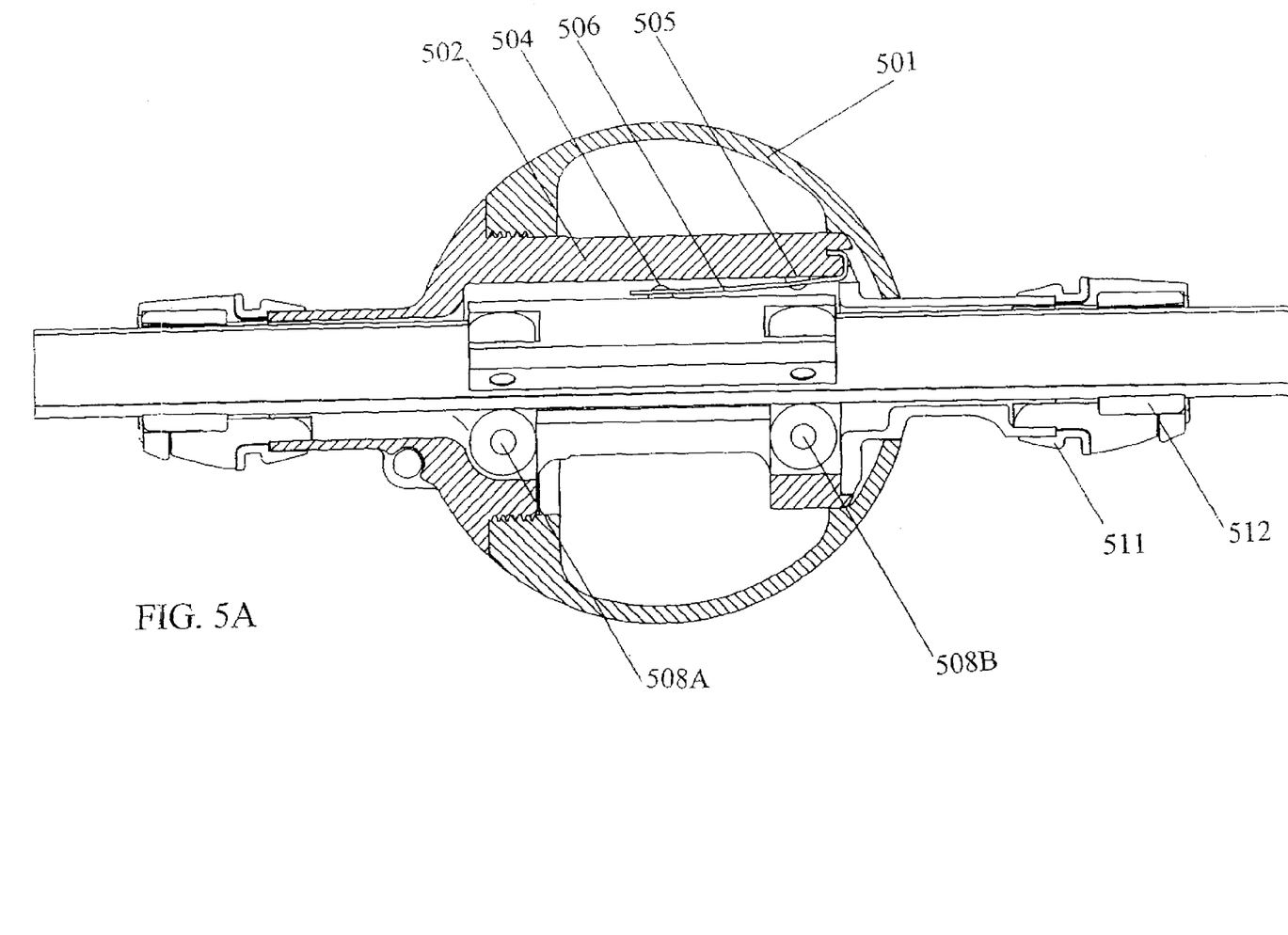
FIGS. 5a and 5b show, in cross-section and isometric cross-section, as embodiment of an encoder node similar to that of FIGS. 4a, 4b and 4c.
Figure 5B:
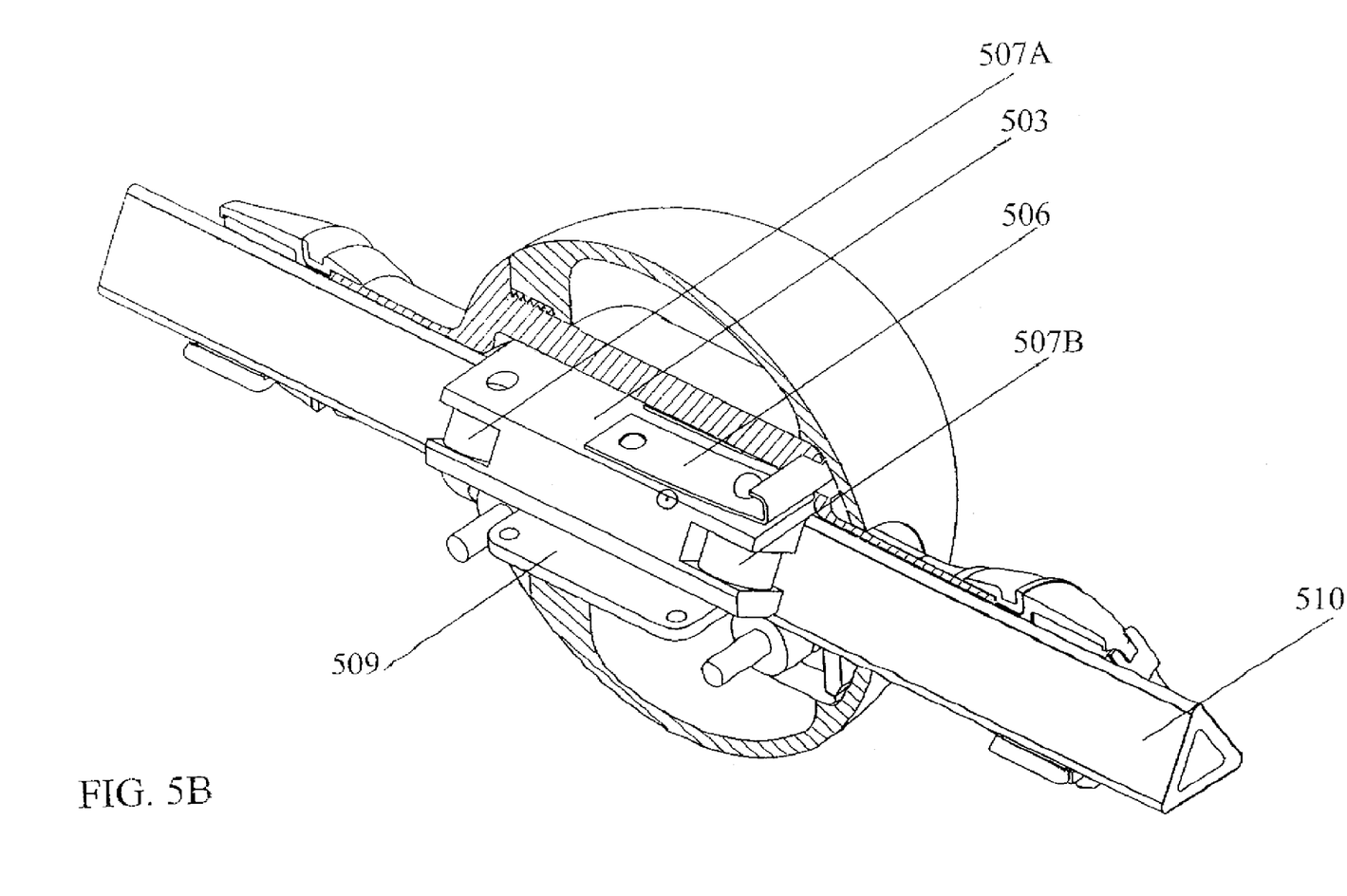

FIGS. 5a and 5b show a side elevation and isometric cross section of the encoder node according to a preferred embodiment.

The shell 501 subtends sufficiently far around the ball's surface such that the ball transfer units always bear against it even at the extremes of its articulation and never roll against the node housing 502, which is preferably formed of plastic. In this embodiment, the housing may screw into the shell.

A further part, roller carrier 503, holds shafts that support four rollers. Two 507a,507b are shown on one side with the two others in a vertical mirror image such that the rollers will rest on the adjacent top faces of the strut 510. Together with the shafts and rollers 508a,508b in the node housing that form a lower constraint for the strut, the strut becomes fully constrained in all movements other than axial. The lower rollers act in pairs across the full width of the strut's face in order to provide more leverage to resist the strut rotating about its axis.

The circuit board/capacitive array sensor 509 is adjustably held against the node housing such that when the strut is installed, an optimum separation distance to the encoder track flexible circuit board on the lower face of the strut can be set.

The roller carrier 503 should be constrained from movement so that it will in turn constrain the movement of the strut. However, it should be able to hold the strut under a pre-load that can then accommodate small manufacturing variances of lack of straightness in the strut. This is accomplished with a leaf spring 506, which folds over the back of the node housing and is firstly displaced by a fulcrum created by two balls that are located in holes in the housing and then locate in holes 505 in the spring 506. The holes in the housing can be backed up by set screws such that the fulcrum height can be adjusted. There are then two further holes in the spring 503 near its end 504 that locates two further balls that in turn locate in the roller carrier 502. The spring 506 is split near its end part way up towards its folded section in order to allow it to more readily flex independently from side to side in order to accommodate manufacturing variances in the strut as it rolls through the node. The arrangement holds the spring 506 unambiguously with respect to the node housing, and the roller carrier 503 unambiguously with respect to the spring 506.

A sectional view of the swivel ring 511 that holds the cover is shown, as is the inserted felt pad seal 512.

Figure 6A:
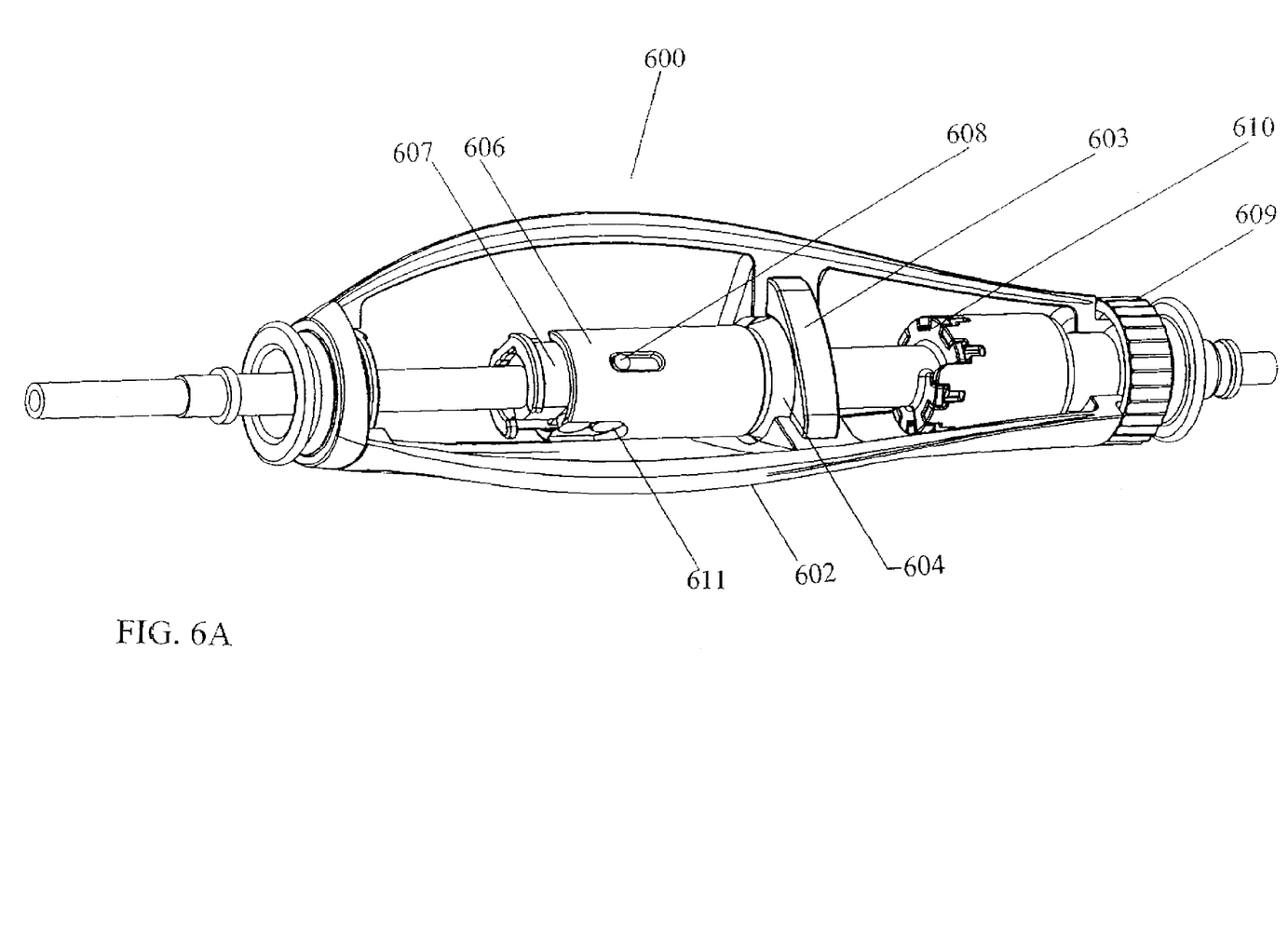
FIGS. 6a and 6b show an embodiment of a handle according to the present invention.
Figure 6B:
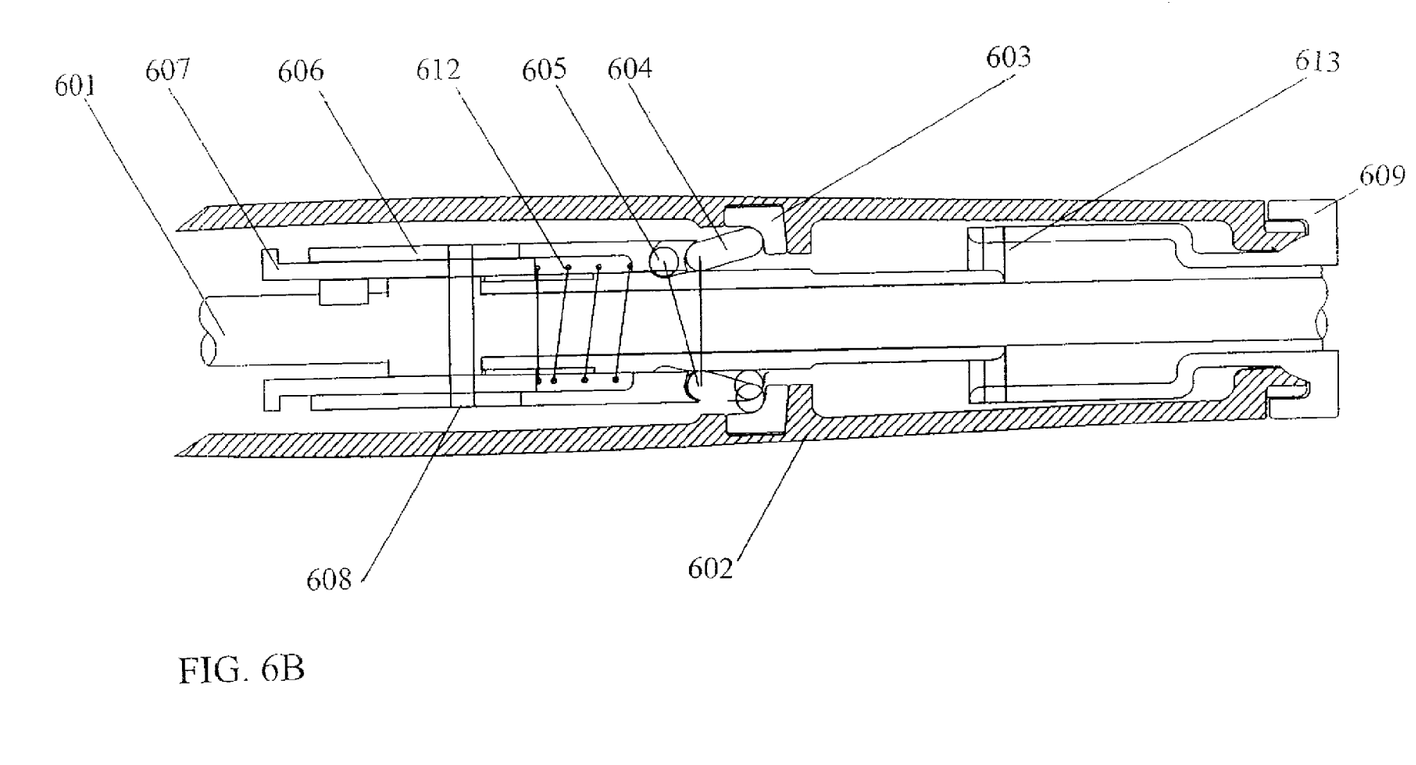

FIG. 6a shows the handle 600 according to a preferred embodiment with one side removed. FIG. 6b shows a diagrammatic section through a portion of the handle 600 of FIG. 6a.

The handle shaft 601 retains a ball at either end that act as the pivot points for the quad and tri-joints. The handle case is preferably comprised of three parts 602 that give it a tri-lobed orthogonal section that is comfortable to hold. The handle 600 is supported at its back end by a partial ball and socket that gives it a pivot point when preloaded backwards but also allows it to move forwards against the preload. Held rigidly to the handle case 602 is a ring 603 and pushing against it is a conical tilt ring 604. The tilt ring 604 applies a steadying force to centralise the handle 600 up to its preload spring force limit.

When the handle 600 is tilted, because the handle 600 cannot move back, the ring 604 must tilt forward (as shown in FIG. 6b to position 605) against a cylindrical slider 606 which in turn displaces and compresses a preload spring 612. It doesn't matter which tilt axis occurs, the slider 606 will similarly displace. If the handle 600 is displaced forward the conical tilt ring 604 and slider 606 are displaced forward. Any combination of forward axial displacement or tilt is therefore accommodated. The tilt ring 604 is designed such that the leverage required to tilt it (by pushing the ball at the end of the stylus against the object to be measured) generates the same load on the stylus ball tip as an equivalent axial displacement of the handle 600.

In a preferred embodiment, the movement of the slider 606 is measured by a proportional Hall sensor, which senses the movement of a pair of small magnets 611 attached to the slider 606.

At the back of the case is a knob 609 that can be rotated by a user. It is connected to a tube that rides around the shaft and engages with a screw thread to the preload adjuster 607. As the knob 604 is rotated, the preload adjuster cannot also rotate because it is constrained by a pin 608 extending through the shaft 601 into a slot in the slider 606. Alternative keyway based constraint systems are also possible. As a result it must move axially and in so doing it compresses or relaxes the preload spring 612. This axial displacement may also measured with a proportional Hall sensor.

The tube that connects the knob 609 with the threaded part may be split 613 for manufacturing convenience where it also changes from having an inner diameter larger than the shaft to an inner diameter conforming to the shaft, and at this interface a screw like mechanical support may be provided. The purpose of this arrangement is to permit a coil of wiring from the button and Hall sensors to pass from the rotating handle case to the non rotating shaft 601 from where it can find a route through the back of the shaft 601 and quad-joint to exit the handle 600 and run up the centre of a strut.

The handle case 602 is preferably free to rotate axially about the handle shaft 601 so that a user can hold it at an ergonomic radial displacement to retain index finger contact with a four position button attached to the front of the case.

The invention having been described in the foregoing by reference to specific embodiments, it is to be appreciated that the embodiments are in all respects exemplary and the modifications and variations are possible without departure from the spirit and scope of the appended claims.

The invention claimed is:

1. A coordinate measuring machine to determine an absolute position at a measuring point tip rigidly connected to a handle, the machine comprising:
   a first, bifurcated linkage;
   a second, trifurcated linkage;
   first and second struts arranged to meet at a bifurcated joint at the first linkage;
   third, fourth and fifth struts arranged to meet at a trifurcated joint at the second linkage, wherein the first and second linkages are coupled via the handle; and
   a framework that supports first through fifth nodes, each node being slidably engaged to a corresponding one of the first through fifth struts, wherein each of the nodes measures the displacement of the corresponding strut relative to the node.

2. The coordinate measuring machine of claim 1, wherein:
   the first and second struts are rotatably engaged to the first, bifurcated linkage; and
   the third, fourth and fifth struts are rotatably engaged to the second, trifurcated linkage.

3. The coordinate measuring machine of claim 1, wherein the nodes are supported the framework in the form of a truss framework arranged as a tetrahedron sitting on an octahedron.

4. The coordinate measuring machine of claim 1, wherein:
   the first and second struts are rotatably engaged to the first linkage about a common axis to allow rotation relative to each other; and
   the first linkage comprises a ball of a ball and socket joint rotatably engaged to the first and second struts to allow rotation together with three degrees of freedom about the ball.

5. The coordinate measuring machine of claim 4, wherein:
   the first and second struts each comprise an annular socket ring for engaging the ball of the ball and socket joint and each other; and
   the annular socket rings comprise magnetic means for urging them together.

6. The coordinate measuring machine of claim 1, wherein:
   the third and fourth struts are rotatably engaged to the second linkage about a common axis to allow rotation relative to each other;
   the second trifurcated linkage comprises a ball of a ball and socket joint rotatably engaged to the third and fourth struts to allow rotation together with three degrees of freedom about the ball; and
   the fifth strut is rotatably engaged about a pivot at the focal point of the ball in at least a single axis.

7. The coordinate measuring machine of claim 6, wherein:
   the third and fourth struts each comprise an annular socket ring for engaging the ball of the ball and socket joint and each other; and
   the annular socket rings comprise magnetic means for urging them together.

8. The coordinate measuring machine of claim 1, wherein the handle comprises an elongate member operable to rotate about its major axis via the first and second linkages.

9. The coordinate measuring machine of claim 8, wherein the handle extends beyond one of the first and second linkages with a replaceable stylus that has a spherical tip of known diameter and is suitable for probing against an object.

10. The coordinate measuring machine of claim 1, comprising a stylus coupled to the handle.

11. The coordinate measuring machine of claim 10, wherein the stylus comprises the measuring point tip.

12. The coordinate measuring machine of claim 1, wherein:
   the handle is operable to tilt about its major axis in any direction and to displace along the major axis;
   the handle is rigidly connected to the measuring point tip;
   the measuring point tip is spherical; and such displacement activates a process of positional measurement.

13. The coordinate measuring machine of claim 12, wherein the handle comprises biasing means for providing a preloaded tilt force against the handle.

14. The coordinate measuring machine of claim 13, wherein:
the biasing means comprises a spring member; and
the preloaded tilt force is operable to be externally varied by means of one or more set screws coupled to the spring member.

15. The coordinate measuring machine of claim 13, comprising means for proportionately measuring the handle displacement to determine the tip contact pressure given a known preload value.

16. The coordinate measuring machine of claim 15, wherein the means for proportionately measuring is operable to proportionately measure with a digitally processed sensor.

17. The coordinate measuring machine of claim 1, wherein the nodes each comprises means for constraining movement of the corresponding strut passing through them to axial motion only by sliding.

18. The coordinate measuring machine of claim 1, wherein:
the struts comprise an elongate section having a triangular cross-section with three flat surfaces; and
one of the three flat surfaces of each strut retains a linear encoder track.

19. The coordinate measuring machine of claim 18, comprising means for constraining the struts against a plurality of rollers.

20. The coordinate measuring machine of claim 1, wherein one or more of the first through fifth nodes comprises:
an annular ring comprising one or more magnets and at least three low friction bearing points; and
a substantially spherical ferromagnetic member slidably engaged to the corresponding strut,
wherein the one or more magnets are arranged such that the substantially spherical ferromagnetic member bears against the at least three low friction bearing points to establish an unambiguous settling position.

21. The coordinate measuring machine of claim 20, wherein the bearing points comprise a recirculating ball transfer unit.

22. A coordinate measuring machine to determine an absolute position at a measuring point tip rigidly connected to a handle, the machine comprising:
a framework that supports a plurality of nodes, each node being slidably engaged to a corresponding strut among a plurality of struts, wherein each of the nodes measures the displacement of the corresponding strut relative to the node as the strut traverses the node; and
a plurality of linkages having corresponding struts among the plurality of struts meeting at multi-furcated joints, wherein at least a first linkage and a second linkage are coupled via the handle.

23. The coordinate measuring machine of claim 22, wherein the plurality of linkages comprises a first, bifurcated linkage and a second, trifurcated linkage and wherein the plurality of struts comprises a first and a second strut arranged to meet at a bifurcated joint at the first bifurcated linkage, and third, fourth and fifth struts arranged to meet at a trifurcated joint at the second linkage.

* * * * *